United States Patent [19]

Kinzler

[11] Patent Number: 4,572,032
[45] Date of Patent: Feb. 25, 1986

[54] RETHREADING DIE AND METHOD

[76] Inventor: Jack A. Kinzler, 107 Pine Shadows Dr., Seabrook, Tex. 77586

[21] Appl. No.: 747,124

[22] Filed: Jun. 20, 1985

Related U.S. Application Data

[62] Division of Ser. No. 418,229, Sep. 15, 1982, abandoned.

[51] Int. Cl.[4] .......................... B21K 21/00; B23G 5/00
[52] U.S. Cl. ................................... 76/101 B; 408/221
[58] Field of Search ................ 29/557, 558; 76/101 B; 408/221, 227, 215, 162, 187, 180; 10/121, 111, 123 R, 113, 1 B

[56] References Cited

U.S. PATENT DOCUMENTS

| | | | |
|---|---|---|---|
| 674,105 | 5/1901 | Timar | 408/162 |
| 888,563 | 5/1908 | Wilkins | 10/121 |
| 1,488,271 | 3/1924 | Miller | 76/101 B |
| 1,606,186 | 11/1926 | Shaefer et al. | 10/113 |
| 1,803,888 | 5/1931 | Basola et al. | 408/187 |
| 1,857,493 | 5/1932 | Campaigne | 408/217 |
| 3,956,787 | 5/1976 | Crumpacker | 10/121 |

FOREIGN PATENT DOCUMENTS

| | | | |
|---|---|---|---|
| 539207 | 6/1922 | France | 76/101 B |
| 541729 | 8/1922 | France | 76/101 B |

Primary Examiner—William R. Briggs
Attorney, Agent, or Firm—Browning, Bushman, Zamecki & Anderson

[57] ABSTRACT

The invention comprises an improved rethreading die, a method of making the die, and a method of rethreading an in situ stud member. The workpiece from which the die is formed has oppositely directed front and rear faces and laterally outwardly facing side surfaces about the periphery of the front and rear faces. Recesses are formed in said workpiece for receipt of a hinge and its retaining pins. The hinge and pins are fitted in the recesses in the workpiece. The hinge and pins are removed, and the workpiece is divided, generally transversely with respect to the front and rear faces, into a pair of die members. The hinge and pins are then replaced in their recesses in engagement with positioning reference surfaces formed by those recesses. The die members thus formed and hingedly connected each have a first end, the first ends being disposed generally adjacent each other to one side of an inner opening formed prior to splitting of the workpiece. The second ends of the two die members are disposed generally adjacent each other and spaced about the inner opening from the first ends. The hinge mechanism permits the second ends of the two die members to be moved toward and away from each other between an open position permitting passage of a stud between the second ends into the inner opening and a closed position permitting engagement of thread forming surfaces adjacent the opening with the stud. Thus, the die may be emplaced about an undamaged inboard portion of an in situ stud, external wrench surfaces on the die can be engaged with a retaining tool, and the die rotated with that tool in a direction to move it progressively outwardly along the stud and over damaged outboard threads.

8 Claims, 4 Drawing Figures

RETHREADING DIE AND METHOD

This is a division of application Ser. No. 418,229, filed Sept. 15, 1982, abandoned.

BACKGROUND OF THE INVENTION

1. Field of the Invention

The present invention pertains to rethreading dies used for repairing damaged threads on screws, bolts, and similar threaded stud members. In many instances, e.g. where the damaged thread is on the end of an engine crankshaft, removal of the stud for replacement or repair is extremely impractical due to the difficulty of disassembling the device in which the stud is installed. Accordingly, it is desirable and frequently attempted to rework the damaged threads of such a stud with the stud in situ, i.e. installed in its intended position in the engine or other device. This in turn typically introduces additional problems of attempting to re-work the thread in a cramped space and with only one "free" end on the damaged member.

2. Description of the Prior Art

One common technique currently known for attempting to rework a damaged threaded stud in situ is through the use of a rethreading die in the form of a nut having a central opening for receipt of the stud member. Facing into and defining this opening are a plurality of thread forming or cutting surfaces interspersed with relieved areas which permit cuttings to fall away from the stud and rethreading die. One problem with this conventional type die is that it must be installed on the free end of the stud and worked inwardly. Frequently, the thread damage to that stud has occurred on or near the free end. Thus, the free end of the stud must be cut away and/or hand worked with a file or other simple tool to permit the die nut to be started on the free end of the stud.

Even if these hand working operations were typically successful, they would be undesirably tedious. However, in addition to this problem, the hand working operations are frequently unsuccessful in that the hand worked threads are not in perfect pitch or alignment with the remainder of the threads on the stud. Accordingly, when the die is started on the hand worked threads and moved inwardly, it will tend to remain on pitch with the hand worked threads and then cross cut and ruin the remainder of the original machined threads. In short, such conventional rethreading die nuts sometimes cause as much or more damage than they remedy.

Other common tools sometimes employed for rethreading are thread files and stock-and-die type threading tools. The former are difficult and tedious to use, as well as imprecise in their results. The latter are unduly large and cumbersome for use on in situ studs.

U.S. Pat. No. 1,488,271 to Miller discloses a modified die nut wherein one side is machined, to receive a tension type adjusting screw, and then split. The split can be widened or narrowed by adjusting the screw, which in turn adjusts the size of the central opening. This arrangement permits only fine adjustments, and does not permit the nut to be opened and emplaced on the inboard end of a damaged stud.

U.S. Pat. No. 888,563 to Wilkins discloses a hinged die. However, the external configuration of this tool would make it virtually impossible to use in situ in close spaces.

U.S. Pat. No. 1,606,186 to Shaefer et al discloses a hinged plyer-like tool suitable for hand working operations as described above.

U.S. Pat. No. 3,956,787 to Crumpacker discloses an unduly complicated collet-like tool. U.S. Pat. No. 1,857,493 to Campaigne pertains to a two-piece adjustable "thread chaser."

None of these prior devices is satisfactory for use in reworking a damaged threaded stud in situ, particularly in closely confined spaces. In particular, none of them provide a simple device, which may be easily manufactured, and which may be installed on the inboard end of a stud, even in a closely confined space, and worked outwardly to repair the damaged thread.

SUMMARY OF THE INVENTION

The present invention provides an improved rethreading die which, while particularly effective in reworking damaged threads in situ and/or in close spaces, may be manufactured with relative ease and simplicity, and may even be formed from a conventional rethreading die nut. Thus, the present invention further comprises an improved method for manufacturing such a rethreading die. The present invention further contemplates an improved method of rethreading an in situ stud member.

More particularly, a rethreading die according to the present invention comprises a pair of opposed die members cooperatively defining an inner opening and thread forming surfaces facing into the opening. The die members further define external wrench surfaces. Each of the die members has a first end and a second end, the first ends of the two die members being disposed generally adjacent each other to one side of the inner opening, and the second ends of the two die members being disposed generally adjacent each other and spaced about the inner opening from the first ends. Hinge means pivotally connect the first ends of the die members for movement of the second ends toward and away from each other between an open position permitting passage of a stud or like workpiece between the second ends and into the inner opening and a closed position permitting abutment of the thread forming surfaces with the workpiece.

This construction permits the second ends to be separated so that the nut can be emplaced on an undamaged inboard portion of an in situ stud and then closed about the stud with the thread forming surfaces in engagement with the good or undamaged threads in the inboard area. A common and simple tool, such as a socket, which can be easily utilized in the close space in question, is then emplaced over the rethreading die nut in engagement with its external wrench surfaces. The die is then worked outwardly, by means of this tool, to rethread the damaged area. Since most mechanics, and even laymen, already own suitable sockets for driving the die nut, the nut itself is a relatively inexpensive addition to the tool set which vastly expands its functional possibilities.

Thus, the tool of the present invention not only facilitates rethreading in situ and/or in close spaces, but virtually eliminates the need for preliminary hand working of the free end of a damaged stud. More specifically, because the rethreading die nut is initially engaged with undamaged threads on the inboard portion of the stud, these threads serve as a guide to insure that the damaged area is rethreaded in perfect pitch with the undamaged area, and that no cross-threading or additional damage is caused.

The die members, in the aforementioned closed position, preferably define an outer polygonal peripheral boundary, with the wrench surfaces lying along and defining the sides of the polygon of said boundary. The hinge means, in closed position, are disposed within said boundary, so that the die nut can be completely and properly engaged with a conventional socket. For the same reason, the outer polygonal peripheral boundary is preferably hexagonal, and of a standard size.

The die may further be provided with indexing means for selectively adjusting the spacing between the second ends of the die members in the closed position. For example, if the die is formed for cutting a standard size thread when engaged in a standard socket of a given size, then if it should be desired to slightly reduce the diameter of a threaded stud in order to provide a looser fit with a cooperating nut or the like, the indexing means can be adjusted to reduce the spacing between the second ends of the die members, thus effectively reducing the diameter of the inner opening. The die can then be used generally in the manner described above, except that it would be engaged with an adjustable tool, such as locking jaw plyers or jaw type wrench, rather than by a socket.

The method of manufacturing a die of the present invention utilizes a workpiece which may, as mentioned, be a conventional one piece rethreading die nut. In any event, the workpiece has oppositely directed front and rear faces and laterally outwardly facing side surfaces about the periphery of the front and rear faces, the side surfaces ultimately forming the external wrench surfaces. In accord with the method of the present invention, recess means are formed in the workpiece for receipt of hinge means, the recess means providing positioning reference surfaces for the hinge means. The hinge means are fitted into the recess means. The hinge means are then removed from the recess means, and the workpiece is divided, generally transversely across the front and rear faces, into a pair of die members as previously described. Finally, the hinge means are replaced in the recess means in engagement with the positioning reference surfaces.

At some point prior to the division of the workpiece, the inner opening and thread forming surfaces are formed. The prefitting of the hinge means with the recess means enables the hinge means, in cooperation with the positioning reference surfaces, to serve as a means for precisely positioning the two die members with respect to each other so that the various thread forming surfaces are properly aligned.

In a preferred form of the method, a slot is first formed extending laterally into the workpiece through one of the side surfaces and generally parallel thereto. A hinge member (preferably a relatively simple metal strip) is fitted into the slot. One set of aligned bores is formed through the workpiece and hinge member transverse to the slot adjacent one end of the hinge member, and one pin is fitted in said first set of bores. Similarly, another set of aligned bores is formed through the workpiece and the hinge member transverse to the slot adjacent the other end of the hinge member, and another pin is fitted in the second set of bores. The hinge member and pins are removed, and the workpiece is divided.

When the hinge member and pins are replaced, one of the pins is snugly mounted in its set of bores so as to fixedly connect the hinge member to one of the die members, while the other pin is rotatably mounted in at least one of the bores of the other set so as to pivotally connect the hinge member to the other of the die members, it being preferable to have only one end of the hinge member pivotally connected to its respective die member. Such pivotal connection can be accomplished by slightly enlarging one of the bores in question before reinserting the pivot pin.

It is a principal object of the present invention to provide an improved rethreading die.

It is another object of the present invention to provide such a rethreading die comprising a pair of hingedly connected die members defining external wrench surfaces.

A further object of the present invention is to provide an improved method of manufacturing such a rethreading die.

Still another object of the present invention is to provide an improved method of rethreading a damaged stud member.

Still other objects, features and advantages of the present invention will be made apparent by the following detailed description, the drawings, and the claims.

DETAILED DESCRIPTION

Figure 1:
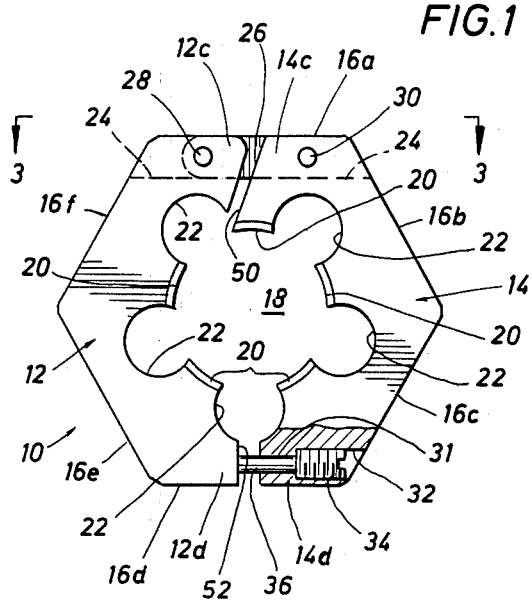
FIG. 1 is a front elevational view of a die in accord with the present invention, with parts broken away, in closed position.
Figure 2:
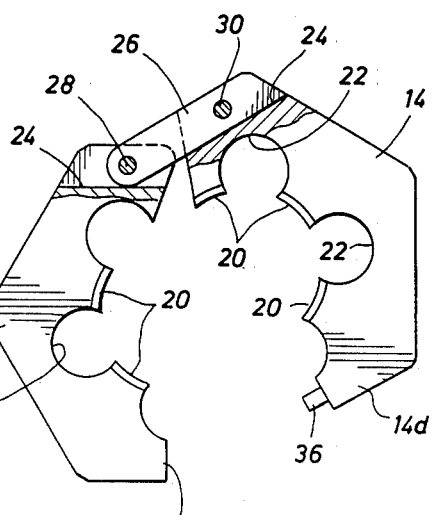
FIG. 2 is a front elevational view of the die of FIG. 1 in open position and with different parts broken away.
Figure 3:
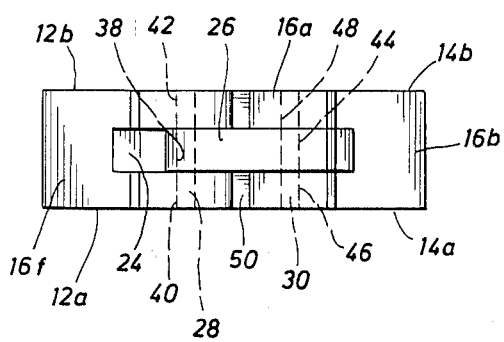
FIG. 3 is a plan view taken along the line 3—3 in FIG. 1 and showing the hinge means.

Referring now to FIGS. 1-3, the rethreading die 10 comprises a pair of opposed die members 12 and 14. Each of the die members may be said to have a respective front face 12a or 14a, which together define a front face of the die 10 in general. Likewise, members 12 and 14 have respective rear faces 12b and 14b, which together form the rear face of the die 10 in general. It should be noted that the terms "front" and "rear" are used for convenience only, and to distinguish from the side and end portions to be described hereinbelow. These terms should not be construed in a limiting sense.

Die members 12 and 14 further define side surfaces 16a-16f which, when the die is in its closed position as shown in FIG. 1, form an outer hexagonal peripheral configuration or boundary about the front and rear faces of the die, the latter faces likewise being hexagonal. Side surfaces 16a-16f may thus serve as wrench surfaces, in a manner to be described more fully hereinbelow.

Die members 12 and 14 also define an inner opening 18 extending centrally through the die member 10 in the front to rear direction. A series of conventional thread forming surfaces 20 formed on die members 12 and 14 face into and are circumferentially spaced about opening 18. Thread forming surfaces 20 are interspersed with relieved spaces 22 extending radially outwardly from opening 18 to permit cuttings to fall away from the die in use in the well known manner.

Die members 12 and 14 have first ends 12c and 14c respectively located adjacent each other, specifically adjacent side 16a of the outer hexagonal periphery of the die. Die members 12 and 14 likewise have respective second ends 12d and 14d located adjacent each other generally diametrically across from ends 12c and 14c, and more specifically adjacent side 16d of the outer hexagonal periphery, when the die 10 is in its closed position as shown in FIG. 1. Ends 12c and 14c are pivotally connected by hinge means to permit ends 12d and 14d to be moved toward and away from each other between the closed position shown in FIG. 1 and an open position shown in FIG. 2.

More specifically, slots 24 extend laterally inwardly with respect to side 16a and generally parallel thereto and receive a hinge member in the form of a flat sided metal strip 26. One end of hinge member 26 is pivotally connected to end 12c of die member 12 by a pin 28. That end of hinge member 26 is rounded to facilitate pivoting action (See FIG. 2). The other end of hinge member 26 is fixedly connected to end 14c of die member 14 by a pin 30. The respective end of hinge member 26 is configured to correspond to the slot 24 to help inhibit pivotal movement. Both pins 28 and 30 extend transversely through slots 24, i.e. in the front to rear direction.

End 14d of die member 14 is bored and counterbored at 32 and 32 respectively, counterbore 32 being tapped to receive an adjusting screw 34. Screw 34 has an integral pin element 36 extending into and through bore 31 so that it may abut end 12d of die member 12. Thus, screw 34 with its pin element 36 serves as an indexing means for adjusting the minimum spacing between ends 12d and 14d of the die members.

The method of manufacture of the die 10 is as follows:

The primary workpiece from which the die member 12 and 14 are formed can be a conventional hexagonal die nut which has been machined in the usual manner to form wrench surfaces 16a-16f, opening 18, relief spaces 22 and thread forming surfaces 20. Such a nut, however, when used as a workpiece for the method of this invention should not have been heat treated, hard faced, or the like. Alternatively, the workpiece may be a short length cut from standard size hexagonal bar stock. In either case, the outer wrench surfaces are preformed, saving machining time and expense.

A slot, destined to become dual slots 24 after splitting of the nut, is next machined so as to extend laterally into and lengthwise along side 16a of the nut. The metal strip 26, destined to serve as the hinge member, is fitted into the slot with a fairly snug sliding fit and temporarily retained in place by any suitable means. A set of three aligned bores 38, 40, 42 (FIG. 3) is then formed, transversely with respect to slot 24, through the rounded end of hinge member 26 and the adjacent portions of the workpiece on opposite sides of slot 24. Pin 28 is then press fitted into the set of bores 38, 40 and 42. Similarly, a set of aligned bores 44, 46 and 48 is formed through the opposite end of hinge member 26 and the adjacent portions of the workpiece on opposite sides of slot 24 transverse to that slot and parallel to the first set of bores. Pin 30 is press fitted into the second set of bores 44, 46 and 48. The surfaces of slot 24, bores 38, 40 and 42, and bores 44, 46 and 48 cooperate to form positioning reference surfaces for engagement with the hinge member 26 and its pins 28 and 30.

Hinge member 26 and pins 28 and 30 are next removed from the workpiece. The workpiece is then transversely split by forming cuts 50 and 52. Cut 52 is preferably formed in the center of side 16b in a true radial direction with respect to central opening 18, while cut 50, formed adjacent opposite side 16a, may conveniently be disposed at a slight angle as shown so as not to interrupt the adjacent thread forming surface 20. At any convenient point in the process, preferably sometime prior to the further steps to be described hereinbelow, bore 31 and counterbore 32 are formed, and the latter is tapped.

Finally, hinge member 26 is replaced in its slot, which will, by this time, have been divided into separate slots 24 in respective die members 12 and 14. Pins 28 and 30 are then replaced in their respective sets of bores 38, 40, 42 and 44, 46, 48. Pin 30 is preferably replaced with a snug fit, as close as possible to the original press fit, to retain the pin itself in place and also to prevent pivotal movement of the adjacent end of hinge member 26 with respect to the attached die member 14. Prior to reinsertion of pin 28, the bore 38 in hinge member 26 is preferably slightly enlarged, so that pin 28 can rotate therein. Bores 40 and 42 are maintained at their original size to provide a snug fit retaining pin 28 in place, while the enlargement of bore 38 permits pivotal movement of the adjacent end of hinge member 26 with respect to the attached die member 12.

The pre-fitting of members 26, 28, 30 with the positioning reference surfaces prior to splitting of the nut, and the reinsertion of those members into engagement with the reference surfaces, causes the hinge member 26 and pins 28 and 30 to serve not only as hinge means but also as means for ensuring perfect alignment of preformed thread cutting surfaces 20.

Finally, adjusting screw 34 with its attached pin 36 is installed. Pin 36 is preferably sized so that, when screw 34 is bottomed on the shoulder between bore 31 and counterbore 32, pin 36 will adjust the size of slit 52 so as to maintain the original dimensions of opening 18. The completed die members 12 and 14 can be heat treated, hard faced, or otherwise treated in any suitable manner as is well known in the art.

Figure 4:
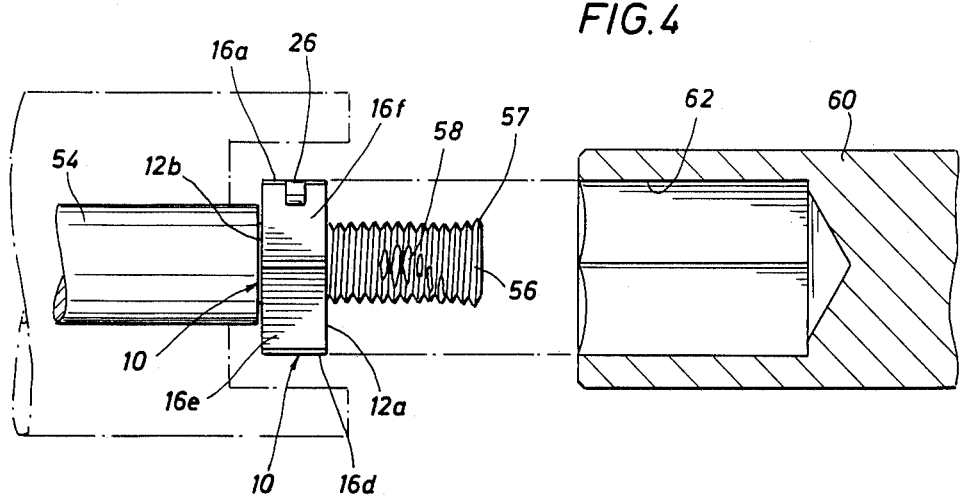
FIG. 4 is a side elevational view of the die in position on a damaged stud and ready for engagement with a suitable retaining tool.

An exemplary method of using the completed die 10 is illustrated in FIG. 4. A stud 56 is shown in situ on a device or member diagrammatically illustrated at 54. The term "stud" is used herein in a broad general sense to denote any member at least partially forming a male threaded section. Stud 56 has a "mushroomed" free end 57 as well as lateral thread damage 58. In actual practice, member 54 would typically be located in a cramped or close space confined by other machine parts diagrammatically indicated in phantom.

The die 10 has been opened, as illustrated in FIG. 2, the inboard portion of stud 56 passed between ends 12b and 14b of the die members and into opening 18, and the die members 12 and 14 closed about stud 56 with their thread forming surfaces 20 mated with undamaged threads on the inboard portion of stud 56. In this closed position, all parts of the die, including the hinge means and adjusting screw, are disposed within the hexagonal periphery formed by sides 16a-16f. Furthermore, this hexagonal periphery is of a standard size to be engaged, with a fairly snug sliding fit, by a conventional socket tool 60. Accordingly, the tool 60 can be advanced along the phantom lines shown in FIG. 4 until its socket 62 encloses the die member 10 and maintains it in proper engagement with the threads of stud 56. Then, by rotating socket tool 60, die 10 can be worked progressively outwardly. The undamaged inboard threads start such progress of the die in proper pitch or alignment therewith so that, as the thread forming surfaces 20 pass over the damaged areas 58 and 57, they will rework these areas into usable threads properly aligned in pitch with the remaining undamaged threads of stud 56.

It will be appreciated that most conventional die nuts have thread forming surfaces 20 which are intended to cut in a given direction. In conventional die nuts, this direction will be that in which the nut is rotated to work it from the outboard end of the stud to the inboard end. Because the die of the present invention is preferably worked from the inboard end of the stud to the outboard end, if it has been formed from a conventional nut, it should be reversed in operation, with what would normally be the rear face of the nut serving as the forward face 12a, 14a.

Although die 10 is sized and shaped for use with a standard socket tool, it could, where space permits, be engaged and rotated with a wrench or pliers. As mentioned, the indexing or adjusting means 34, 35 may be designed to provide perfect orientation of surfaces 20 and 16a-f when fully advanced with respect to counterbore 32. Alternatively, where the die is used with a wrench, pliers, or the like, such orientation may be ensured by adjusting screw 34 until the distance between all pairs of opposed wrench surfaces 16a/16d, 16b/16e, and 16c/16f is equal. This ensures against unequal application of torque.

As mentioned, the die 10 is capable of correcting "heading" or "mushrooming" 57 of the extreme free end of a stud and associated thread damage or destruction. Such deformation frequently occurs, for example, where a threaded crankshaft end has been hammered. Only if the heading is extreme is any preliminary hand working required, and even then, such work is simplified in that it is only necessary to reduce the stud end diameter to within the general range, e.g. less than or equal to the original O.D. plus three times the thread height, of the inner diameter of opening 18.

Another technique for use of the die 10 is in reducing the diameter of a threaded member to provide a looser fit with a cooperating female member. For this purpose, screw 34 can be backed slightly outwardly in bore 32 to reduce the minimum distance between ends 12d and 14d of the die members, determined by the protruding pin 36. While such an adjustment will place the thread forming surfaces 20 slightly "out of round" with respect to one another, a minor deviation in this regard is tolerable. The die can then be installed on and worked over a stud in generally the manner described above except that, since the die may no longer properly fit in a standard socket tool such as illustrated at 60, it may be necessary to hold the die members 12 and 14 in their closed position and work the die outwardly with some other type of hand tool, such as an adjustable wrench, locking jaw pliers, or the like.

Numerous modifications of the methods and apparatus described hereinabove will suggest themselves to those of skill in the art. By way of example only, certain of the method steps may be performed in a different order from that given above. Other modifications might be made in the configuration of the die itself. Accordingly, it is intended that the scope of the present invention be limited only by the claims which follow.

I claim:

1. A method of making a rethreading die from a workpiece having oppositely directed front and rear faces and laterally outwardly facing side surfaces about the periphery of said front and rear faces, said method comprising the steps of:
   forming recess means in said workpiece for receipt of hinge means, said recess means providing positioning reference surfaces for said hinge means;
   fitting said hinge means in said recess means;
   removing said hinge means from said recess means;
   dividing said workpiece, generally transversely across said front and rear faces, into a pair of die members, each of said die members having a first end and a second end, the first ends being disposed generally adjacent each other and adjacent said recess means, and the second ends being disposed generally adjacent each other and spaced about the periphery of said workpiece from said first ends;
   replacing said hinge means in said recess means in engagement with said positioning reference surfaces.

2. The method of claim 1 wherein a slot is first formed extending laterally into said workpiece through one of said side surfaces; a hinge member is fitted into said slot; one set of aligned bores is formed through said workpiece and said hinge member transverse to said slot adjacent one end of said hinge member; one pin is fitted in said first set of bores; another set of aligned bores is formed through said workpiece and said hinge member transverse to said slot adjacent the other end of said hinge member; another pin is fitted in said second set of bores; said hinge member and said pins are removed; and said workpiece is so divided between the one and another bores thereof.

3. The method of claim 2, wherein subsequent to said dividing of said workpiece, said hinge member is replaced in said slot and said pins are replaced in said bores, said one pin being snugly mounted in said one set of bores so as to fixedly connect said hinge member to one of said die members, and said other pin being rotatably mounted in at least one of the bores of said other set so as to pivotally connect said hinge member to the other of said die members.

4. The method of claim 2 wherein said workpiece is preformed with said front and rear faces being substantially identically polygonal, said side surfaces defining an outer polygonal boundary of said workpiece.

5. The method of claim 4 wherein said workpiece is a length of standard size hexagonal bar stock.

6. The method of claim 4 wherein said slot and said hinge member lie generally along and parallel to one side of said polygon, said hinge member being so fitted in said slot as to be disposed within said outer polygonal boundary when said die members are in a closed position.

7. The method of claim 1 comprising the further steps of forming an opening in said workpiece through said front and rear faces and forming thread forming surfaces facing generally into said opening, prior to said division of said workpiece.

8. The method of claim 1 comprising the further step of providing indexing means for selectively adjusting the minimum spacing between said second ends of said die members.

* * * * *